US011816833B2

(12) United States Patent
Jung

(10) Patent No.: US 11,816,833 B2
(45) Date of Patent: Nov. 14, 2023

(54) METHOD FOR RECONSTRUCTING SERIES OF SLICE IMAGES AND APPARATUS USING SAME

(71) Applicant: VUNO, INC., Seoul (KR)

(72) Inventor: Kyuhwan Jung, Seoul (KR)

(73) Assignee: VUNO INC., Seoul (KR)

( * ) Notice: Subject to any disclaimer, the term of this patent is extended or adjusted under 35 U.S.C. 154(b) by 276 days.

(21) Appl. No.: 16/963,408

(22) PCT Filed: Jan. 18, 2019

(86) PCT No.: PCT/KR2019/000758
§ 371 (c)(1),
(2) Date: Jul. 20, 2020

(87) PCT Pub. No.: WO2019/143177
PCT Pub. Date: Jul. 25, 2019

(65) Prior Publication Data
US 2021/0374948 A1 Dec. 2, 2021

(30) Foreign Application Priority Data
Jan. 18, 2018 (KR) .................. 10-2018-0006502

(51) Int. Cl.
G06T 7/00 (2017.01)
G06T 3/40 (2006.01)

(52) U.S. Cl.
CPC .......... G06T 7/0012 (2013.01); G06T 3/4053 (2013.01); G06T 2207/10081 (2013.01);
(Continued)

(58) Field of Classification Search
None
See application file for complete search history.

(56) References Cited

U.S. PATENT DOCUMENTS 6,023,494 A 2/2000 Senzig et al.
7,471,291 B2 12/2008 Kaufman et al.
(Continued)

FOREIGN PATENT DOCUMENTS

CN 107330444 A 11/2017
JP 7-14030 1/1995
(Continued)

OTHER PUBLICATIONS

Li, Zeju, Yuanyuan Wang, and Jinhua Yu. "Reconstruction of thin-slice medical images using generative adversarial network." International workshop on machine learning in medical imaging. Springer, Cham, 2017. (Year: 2017).*
(Continued)

Primary Examiner — Samah A Beg
(74) Attorney, Agent, or Firm — IP & T GROUP LLP

(57) ABSTRACT

The present invention relates to a method for reconstructing an image and an apparatus using the same Particularly, according to the method of the present invention, when a series of first slice images of a subject are inputted in a computing device, the computing device generates, from the first slice images, second slice images having a second slice thickness different from a first thickness, which is the slice thickness of the first slice image, and provides the generated second slice images.

11 Claims, 4 Drawing Sheets

(52) U.S. Cl.
CPC .............. *G06T 2207/20081* (2013.01); *G06T 2207/20084* (2013.01); *G06T 2207/20108* (2013.01); *G06T 2207/30096* (2013.01)

(56) References Cited

U.S. PATENT DOCUMENTS

| | | | |
|---|---|---|---|
| 7,660,448 B2 | 2/2010 | Collins et al. | |
| 8,938,113 B2 | 1/2015 | Kovalan et al. | |
| 2005/0232474 A1* | 10/2005 | Wei ..................... | G06T 7/0012 382/128 |
| 2007/0206008 A1 | 9/2007 | Kaufman et al. | |
| 2013/0121548 A1 | 5/2013 | Kovalan et al. | |
| 2020/0397334 A1* | 12/2020 | Fang ..................... | G06T 15/00 |

FOREIGN PATENT DOCUMENTS

| | | |
|---|---|---|
| JP | 7-21349 | 1/1995 |
| JP | 2000-139897 A | 5/2000 |
| JP | 2008-6188 A | 1/2008 |
| JP | 4502426 B2 | 7/2010 |
| JP | 4800129 B2 | 8/2011 |
| JP | 2017-146957 A | 8/2017 |
| JP | 6288221 B2 | 2/2018 |
| KR | 10-2004-0035568 | 3/2004 |
| KR | 10-2013-0088730 | 8/2013 |
| KR | 10-2014-0024890 | 3/2014 |
| KR | 10-1453711 | 10/2014 |
| KR | 10-2017-0058277 | 5/2017 |
| KR | 10-1771362 | 8/2017 |
| KR | 10-1894278 | 9/2018 |
| KR | 10-2108418 | 5/2020 |
| KR | 10-2112706 | 5/2020 |
| KR | 10-2020-0082660 | 7/2020 |
| WO | 2006/026468 A2 | 3/2006 |

OTHER PUBLICATIONS

Dzyubachyk, Oleh, et al. "Interactive local super-resolution reconstruction of whole-body MRI mouse data: a pilot study with applications to bone and kidney metastases." Plos one 9.9 (2014): e108730. (Year: 2014).*

Goodfellow, I J et al., Generative Adversarial Nets June, ArXiv 2014.

Dong C et al., Image Super-Resolution Using Deep Convolutional Networks, V3, Jul. 31, 2015.

Liu M Y et al., Coupled Generative Adversarial Networks, 30th Conference on Neural information Processing Systems (NIPS 2016), Barcelona, Spain.

* cited by examiner

[FIG. 1]
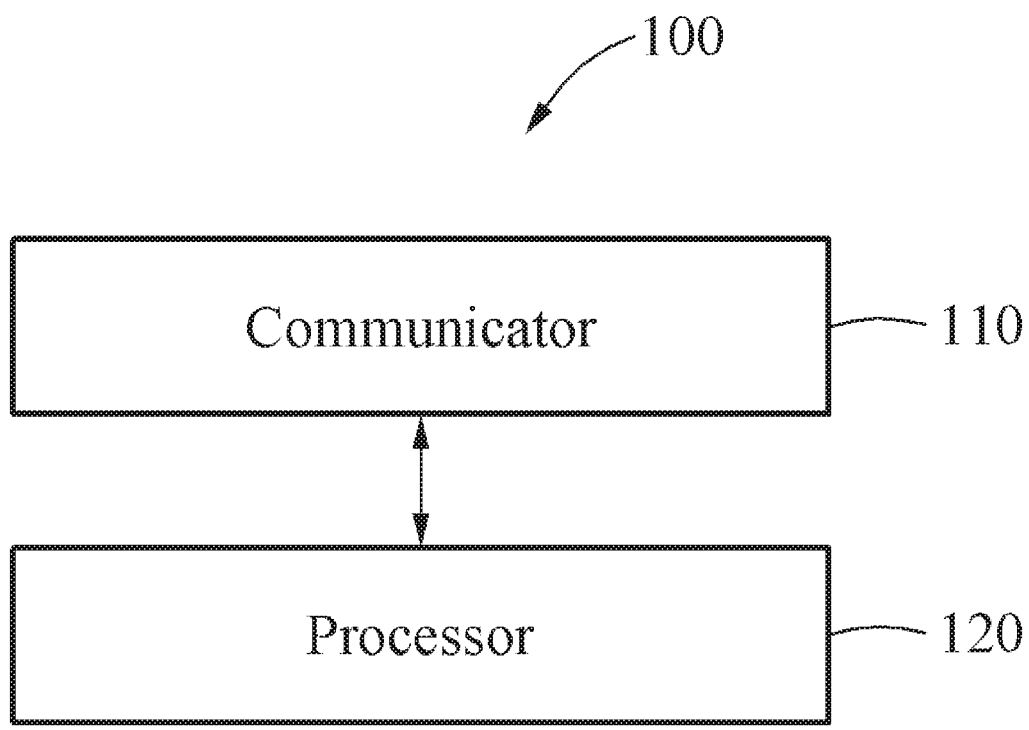

[FIG. 2]
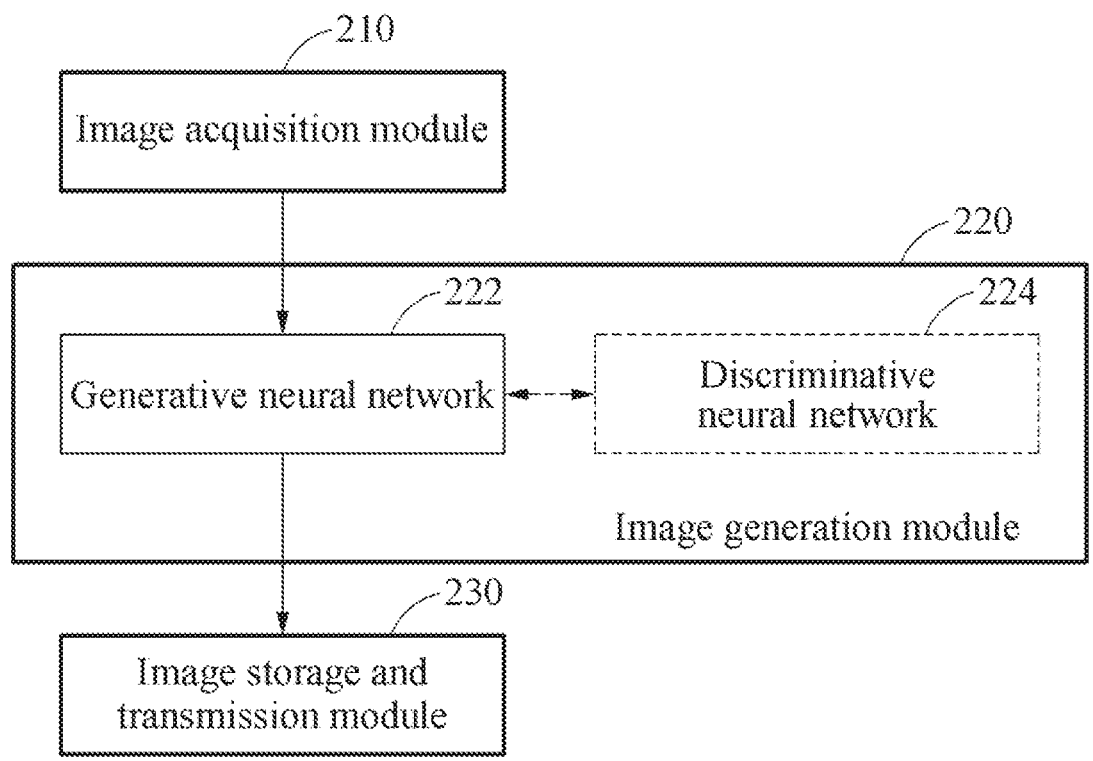

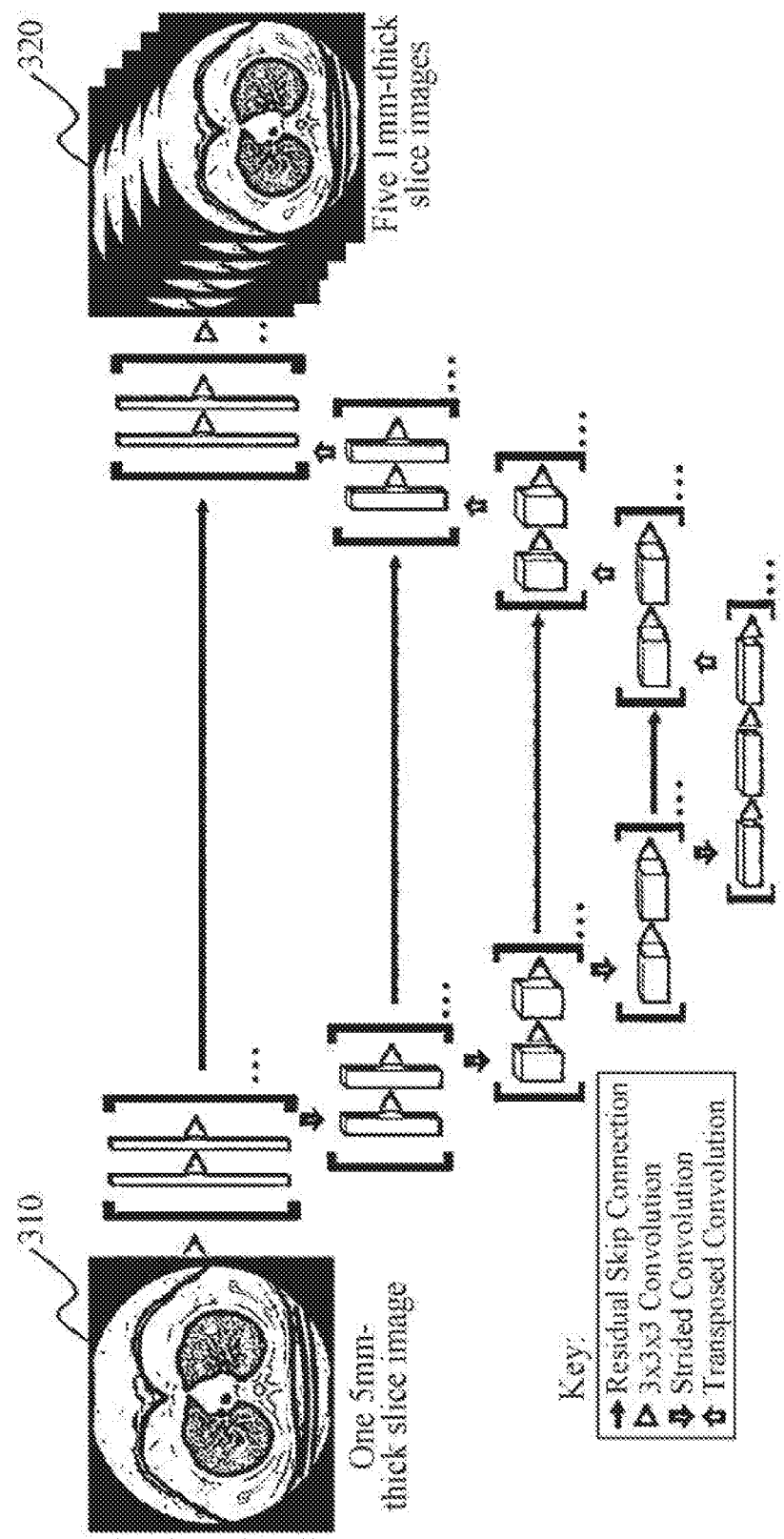
[FIG. 3]

[FIG. 4]
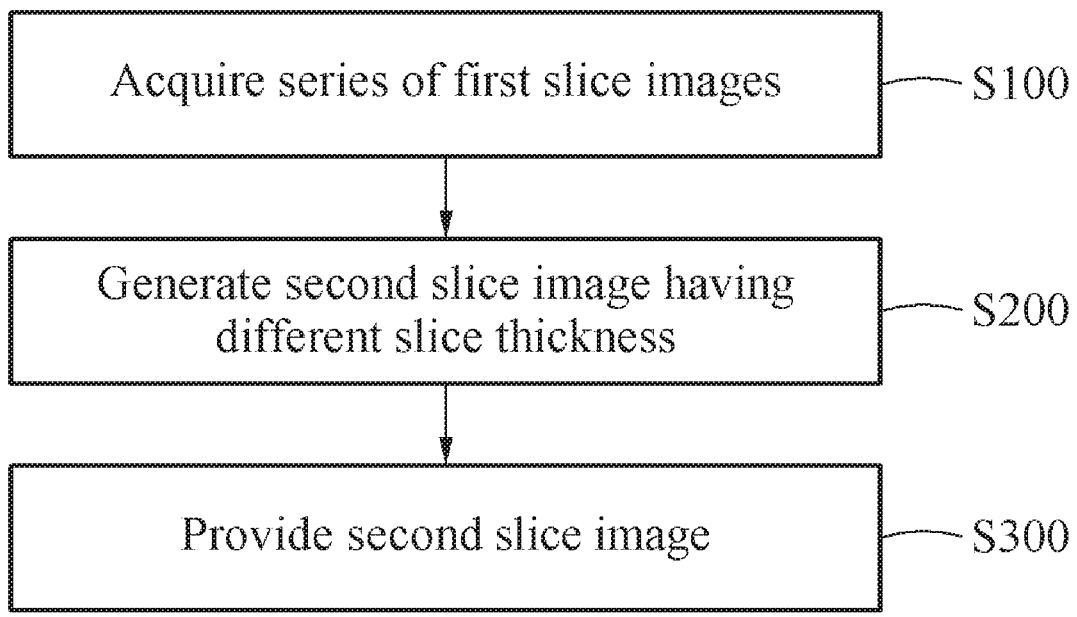

METHOD FOR RECONSTRUCTING SERIES OF SLICE IMAGES AND APPARATUS USING SAME

CROSS-REFERENCE TO RELATED APPLICATIONS

This application is a national stage application of PCT/KR2019/000758 filed on Jan. 18, 2019, which claims priority of Korean patent application numbers 10-2018-0006502 filed on Jan. 18, 2018. The disclosure of each of the foregoing applications is incorporated herein by reference in its entirety.

TECHNICAL FIELD

The present invention relates to a method of reconstructing an image and an apparatus using the same. More particularly, according to a method of the present invention, when a series of first slice images of a subject are input to a computing apparatus, the computing apparatus generates a second slice image having a second slice thickness different from a first slice thickness that is a slice thickness of the first slice thickness and provides the generated second slice image.

RELATED ART

Currently, computed tomography (CT) technology is widely used as an imaging test to analyze lesions and use the same for diagnosis. Individual slice images constituting a CT image are acquired by projecting a volume with a predetermined thickness onto a plane. Here, a thickness of the individual slice images is referred to as a thickness of the CT image for convenience. For example, a 5 mm thick image refers to an image acquired by combining information of a 5 mm thick space into a single image and thus, the image is blurry, that is, has a low quality.

The thickness of the CT image is differently reconstructed based on the purpose and environment of CT reading. As the thickness becomes thinner, the quality of the image and the accuracy of reading may improve. On the contrary, a number of CT images increases and a relatively long period of time is used for reading accordingly. Therefore, in an environment in which the reading efficiency is important, such as a medical examination, it is typical to read a CT image with a thickness of 5 mm and to perform reading using an image with a thin thickness, such as 1 mm, for diagnosis of a high-risk patient.

In a reading aid system, such as using an image for diagnosis of a high-risk patient, it is known that a lesion detected in a 1 mm thick image has a higher detection accuracy than that of a lesion detected in a 5 mm thick image. However, depending on cases, only the 5 mm thick image is available and the 1 mm thick image may not be separately acquirable. Therefore, in this case, if the 1 mm thick image is synthesizable from the 5 mm thick image, it is possible to improve the overall accuracy of computer-aided reading with the efficiency, for example, by acquiring reading and diagnosis results using the reading aid system based on the synthesized image and by displaying the acquired reading and diagnosis results on the original 5 mm thick image.

The present invention proposes a method that may reconstruct slice images such that thin slice images may be acquired from relatively thicker slice images and an apparatus using the same.

PRIOR ART DOCUMENT (Patent Document 1) U.S. Pat. No. 6,023,494 B
(Patent Document 2) U.S. Pat. No. 7,660,448 B
(Non-Patent Document 1): Goodfellow, Ian J.; Pouget-Abadie, Jean; Mirza, Mehdi; Xu, Bing; Warde-Farley, David; Ozair, Sherjil; Courville, Aaron; Bengio, Yoshua (2014). "Generative Adversarial Networks"
(Non-Patent Document 2): Chao Dong etal. Image Super-Resolution Using Deep Convolutional Networks, arXiv preprint arXiv:1501.00092v3, 2015

DETAILED DESCRIPTION

Technical Subject

The present invention is to convert relatively thicker slice images to thinner slice images.

In detail, the present invention is to improve quality of an individual slice image and to facilitate reading through conversion to thinner slice images.

Accordingly, the present invention is to reconstruct thin slice images from thick slice images to assist a doctor to derive further accurate diagnosis results and to improve an analysis accuracy of a reading aid system.

Solution

Characteristic constitutions of the present invention to accomplish the aforementioned objectives and to achieve characteristic effects of the present invention are as follows:

According to an aspect of the present invention, there is provided a method of reconstructing an image, the method including: (a) in response to an input of a series of first slice images of a subject, generating, by a computing apparatus, or supporting another apparatus interacting with the computing apparatus to generate, from the first slice image, a second slice image having a second slice thickness different from a first slice thickness that is a slice thickness of the first slice image; and (b) providing, by the computing apparatus, or supporting providing the generated second slice images.

According to another aspect of the present invention, there is provided a computer program stored in a non-transitory computer-readable record medium including instructions configured to cause a computing apparatus to perform the image reconstruction method according to the present invention.

According to still another aspect of the present invention, there is provided a computing apparatus for reconstructing an image, the apparatus including: a communicator configured to receive a series of first slice images of a subject; and a processor configured to, in response to an input of the series of first slice images, generate or support another apparatus interacting through the communicator to generate, from the first slice image, a second slice image having a second slice thickness different from a first slice thickness that is a slice thickness of the first slice image. The processor is configured to provide or support the other apparatus to provide the generated second slice image.

Effects

According to the present invention, since images in which relatively thicker spatial information is combined into a single image are converted to thinner slice images, the quality of slice images may be improved.

Also, according to the present invention, since higher quality slice images are available, it is possible to improve the accuracy in generating reading information by a human or a computer reading aid system.

According to an example embodiment of the present invention, it is possible increase a speed of reading by displaying a relatively thick slice image at a location with a low lesion suspicion and to improve the accuracy of reading by displaying a synthesized thinner slice image at a location with a high lesion suspicion, thereby making a result reading by a human become quicker and more accurate.

For example, according to the present invention, it is possible to innovate the workflow in the medical field by saving a time used for the medical staff to diagnose a lesion and by improving a speed and quality of reading.

Further, the present invention may use a medical image used in the conventional hospital, for example, an ultrasound image and an MRI image acquired three-dimensionally and thus, a method of the present invention is not subject to an image or a platform in a specific form.

BRIEF DESCRIPTION OF DRAWINGS

Example embodiments will be described in more in detail with reference to the following figures that are simply a portion of the example embodiments and those skilled in the art to which the present invention pertains may readily acquire other figures based on the figures without an inventive work being made:

FIG. 1 is a conceptual diagram schematically illustrating an example of a configuration of a computing apparatus configured to perform a method (hereinafter, referred to as an "image reconstruction method") of reconstructing a second slice image having a different slice thickness from a first slice image according to the present invention.

FIG. 2 is a block diagram illustrating an example of hardware or software components of a computing apparatus configured to perform an image reconstruction method according to the present invention.

FIG. 3 conceptually illustrates an image reconstruction method according to the present invention.

FIG. 4 is a flowchart illustrating an example of an image reconstruction method according to the present invention.

BEST MODE

The following detailed description of the present invention is described with reference to the accompanying drawings in which specific example embodiments are illustrated as examples, to fully describe purposes, technical solutions, and advantages of the present invention. The example embodiments are described in detail enough for those skilled in the art to carry out the present invention.

Further, the term "image" or "image data" used throughout the detailed description and the claims herein refers to multi-dimensional data that includes discrete image factors (e.g., pixels in a two-dimensional (2D) image and voxels in a three-dimensional (3D) image). For example, the term "image" may refer to a medical image of a subject collected by cone-beam computed tomography (CT), magnetic resonance imaging (MRI), an ultrasound system, or other medical image systems known in the field to which the present invention pertains. Also, the image may be provided in a non-medical context, for example, a remote sensing system, an electron microscopy, and the like.

The term "image" used throughout the detailed description and the claims of the present invention may refer to an image that is visible with an eye (e.g., displayed on a video screen) or a digital representation of an image (e.g., a file corresponding to a pixel output of CT, an MRI detector, and the like).

For clarity of description, cone-beam computed tomography (CBCT) image data is illustrated in the drawings as an exemplary image modality. However, it will be apparent to those skilled in the art that image modalities used in various example embodiments of the present invention may include X-ray images, MRI, CT, positron emission tomography (PET), PET-CT, single photo emission computed tomography (SPECT), SPECT-CT, MR-PET, 3D ultrasound images, and the like, any 3D image and slice image derived therefrom, without being Limited thereto.

The term "Digital Imaging and Communications in Medicine (DICOM)" standard used throughout the detailed description and the claims of the present invention is a generic term for a plurality of standards used for digital image representation and communication in medical devices. The DICOM standard is published by the American College of Radiology (ACR) and the National Electrical Manufacturers Association (NEMA).

Also, the term "Picture Archiving and Communication System (PACS)" used throughout the detailed description and the claims of the present invention is a term for systems that perform storage, processing, and transmission according to the DICOM standard. A medical image acquired using digital medical imaging equipment, such as X-ray, CT, and MRI, may be stored in a DICOM format and may be transmitted to a terminal inside or outside a hospital over a network. Here, a reading result and a medical record may be added to the medical image.

Further, the term "training" or "learning" used throughout the detailed description and the claims of the present invention refers to performing a machine learning through computing according to a procedure and it will be apparent to those skilled in the art that the term is not intended to refer to a mental action such as an educational activity of a human.

Also, the terms "comprises/includes" used throughout the detailed description and the claims of the present invention are not intended to exclude other technical features, additions, components, or operations. Also, "single" or "one" is used to indicate at least one and "another" is limited to at least second or more.

Those skilled in the art may clearly understand a portion of other purposes, advantages, and features of the present invention from this specification and another portion thereof from implementations of the present invention. The following examples and drawings are provided as examples only and not to limit the present invention. Therefore, the detailed description disclosed herein should not be interpreted as a limiting meaning with respect to a specific structure or function and should be interpreted as representative basic data that provides guidelines such that those skilled in the art may variously implement the present invention as substantially suitable detailed structures.

Further, the present invention may include any possible combinations of example embodiments described herein. It should be understood that, although various example embodiments differ from each other, they do not need to be exclusive. For example, a specific shape, structure, and feature described herein may be implemented as another example embodiment without departing from the spirit and scope of the present invention. Also, it should be understood that a position or an arrangement of an individual component of each disclosed example embodiment may be modified without departing from the spirit and scope of the present invention. Accordingly, the following detailed description is not to be construed as being limiting and the scope of the present invention, if properly described, is limited by the claims, their equivalents, and all variations within the scope of the claims. In the drawings, like reference numerals refer to like elements throughout.

Unless the context clearly indicates otherwise, the singular forms "a," "an," and "the," are intended to include the plural forms as well. Also, when description related to a known configuration or function is deemed to render the present invention ambiguous, the corresponding description is omitted.

Hereinafter, example embodiments of the present invention are described in detail with reference to the accompanying drawings such that those skilled in the art may easily perform the example embodiments.

FIG. 1 is a conceptual diagram schematically illustrating an example of a configuration of a computing apparatus configured to perform an image reconstruction method according to the present invention.

Referring to FIG. 1, a computing apparatus 100 according to an example embodiment of the present invention includes a communicator 110 and a processor 120, and may directly or indirectly communicate with an external computing apparatus (not shown) through the communicator 110.

In detail, the computing apparatus 100 may achieve a desired system performance using a combination of typical computer hardware (e.g., an apparatus including a computer processor, a memory, a storage, an input device and an output device, components of other existing computing apparatuses, etc.; an electronic communication apparatus such as a router, a switch, etc.; an electronic information storage system such as a network-attached storage (NAS) and a storage area network (SAN)) and computer software (i.e., instructions that enable a computing apparatus to function in a specific manner).

The communicator 110 of the computing apparatus may transmit and receive a request and a response with another interacting computing apparatus. As an example, the request and the response may be implemented using the same transmission control protocol (TCP) session. However, it is provided as an example only. For example, the request and the response may be transmitted and received as a user datagram protocol (UDP) datagram. In addition, in a broad sense, the communicator 110 may include a keyboard, a mouse, and other external input devices to receive a command or an instruction, etc., and a printer, a display, and other external input devices.

Also, the processor 120 of the computing apparatus may include a hardware configuration, such as a micro processing unit (MPU), a central processing unit (CPU), a graphics processing unit (GPU), a tensor processing unit (TPU), a cache memory, a data bus, and the like. Also, the processor 120 may further include a software configuration of an application that performs a specific objective, an operating system (OS), and the like.

FIG. 2 is a block diagram illustrating an example of hardware or software components of a computing apparatus configured to perform an image reconstruction method according to the present invention.

Describing a method and a configuration of an apparatus according to the present invention with reference to FIG. 2, the computing apparatus 100 may include an image acquisition module 210 as a component. The image acquisition module 210 is configured to acquire a 3D image, that is, a series of first slice images, to which the method according to the present invention applies. It will be apparent to those skilled in the art that individual modules of FIG. 2 may be configured through, for example, the communicator 110 or the processor 120 included in the computing apparatus 100, or through interaction between the communicator 110 and the processor 120. A slice image may be acquired from an external image storage system, such as, for example, an imaging device interacting through the communicator 110 or Picture Archiving and Communication System (PACS). However, it is provided as an example only. For example, a slice image may be captured by a (medical) imaging device and transmitted to the PACS according to the DICOM standard and then, acquired by the image acquisition module 210 of the computing apparatus 100.

Next, the acquired medical image may be forwarded to an image generation module 220. The image generation module 220 is configured to generate a second slice image suitable for a feature extracted from the first slice image. For example, the image generation module 220 may be configured based on a recent neural network, for example, a fully convolutional neural network (FCNN) and a generative adversarial network (GAN). For example, a configuration of the GAN is described in Non-Patent Document 1: [Goodfellow, Ian J.; Pouget-Abadie, Jean; Mirza, Mehdi; Xu, Bing; Warde-Farley, David; Ozair, Sherjil; Courville, Aaron; Bengio, Yoshua (2014). "Generative Adversarial Networks"].

For example, the image generation module 220 may be a GAN that includes a generative neural network 222 and a discriminative neural network 224, which is conceptually illustrated in FIG. 2. However, it is provided as an example only and various methods may be applied as a method used for the image generation module 220 without being limited to the GAN, which is described blow. The image generation module 220 of which learning or training is completed may include only the generative neural network 222 since the discriminative neural network 224 is for learning, as described below.

Once a second slice image is generated, the second slice image may be forwarded to an image storage and transmission module 230. The image storage and transmission module 230 may store information of the second slice image or may provide the information to an external entity. When the information of the second slice image is provided to the external entity, the image storage and transmission module 230 may go through a predetermined display device. Storing of the second slice image may be performed by another apparatus interacting with the computing apparatus 100, for example, PACS.

Although it is illustrated that the components of FIG. 2 are implemented in a single computing apparatus for clarity of description, the computing apparatus 100 that performs the method of the present invention may be configured such that a plurality of apparatuses may interact with each other.

Hereinafter, an example embodiment of the image reconstruction method according to the present invention is further described with reference to FIGS. 3 and 4.

FIG. 3 conceptually illustrates an image reconstruction method according to the present invention, and FIG. 4 is a flowchart illustrating an example of an image reconstruction method according to the present invention.

Referring to FIGS. 3 and 4, the image reconstruction method according to the present invention includes operation S100 of receiving, by the image acquisition module 210 implemented by the computing apparatus 100, or supporting another apparatus interacting with the computing apparatus 100 to receive a series of first slice images of a subject.

Referring to FIG. 3, the series of first slice images may be an axial image of chest CT 310.

Although it is described herein, for clarity of description, that a chest CT image is reconstructed to aid a lung related lesion, such as, nodule, it is provided as an example only. Without being limited thereto, it may apply to any of 3D medical images capable of generally adjusting a thickness of a slice image.

Next, the image reconstruction method according to the present invention further includes operation S200 of generating, by the image generation module 220 implemented by the computing apparatus 100, or supporting the other apparatus to generate a second slice image 320 having a second slice thickness different from the first slice thickness based on the acquired first slice image and a thickness of the first slice image. Here, in each of the series of first slice images, at least a portion of an area of the first slice thickness may overlap an area of another adjacent first slice image.

In one example embodiment, if a number of acquired first slice images is n (n≥1) and a thickness of the first slice image is t, a number of second slice images to be generated therefrom may be m (m>n). In this case, a second slice thickness T may be T≥n*t/m.

Those skilled in the art may understand that it is impossible to generate a second slice image with better quality from a first slice image using a simple interpolation, for example, a linear interpolation.

Accordingly, in the image reconstruction method of the present invention, an image generation module for generating second slice images from first slice images use the image generation module 220 trained based on mass first slice images and second slice images corresponding thereto instead of considering only input specific first slice images.

Briefly describing, the image generation module 220 is configured to extract a feature of input slice images, that is, the first slice images and to reconstruct output slice images, that is, the second slice images, suitable for the feature. For example, since an FCNN that is a deep CNN configured to generate the second slice images 320 from the first slice images 310 is used, relationships of residual skip connection, 3×3×3 convolution, strided convolution, and transposed convolution may be established between layers constituting the same, which is illustrated in FIG. 3.

The GAN as well as the FCNN may apply. According to the paper related to the GAN, i.e., Non-Patent Document 1: Goodfellow, Ian J.; Pouget-Abadie, Jean; Mirza, Mehdi; Xu, Bing; Warde-Farley, David; Ozair, Sherjil; Courville, Aaron; Bengio, Yoshua (2014). "Generative Adversarial Networks", the generative neural network 222 has a goal of generating an image similar to a real image and to deceive the discriminative neural network 224 to classify the similar image as the real image. On the contrary, the discriminative neural network 224 has a goal of discriminating the real image and similar data from each other. During the progress of learning by the GAN, each of the generative neural network and the discriminative neural network updates a network weight to achieve the respective corresponding goal. It is known that, after sufficient learning, the generative neural network generates an image similar to a real image and a discrimination rate by the discriminative neural network theoretically converges to 0.5. As described above, various classes (types) of images corresponding to a single image may be generated by improving the GAN. As another example of using the GAN, operation S200 of generating second slice images having a feature similar to that of input first slice images may be performed.

Desirably, the second slice thickness or the first slice thickness and the second slice thickness may be provided as parameters to the generative neural network 222 to generate second slice images having various slice thicknesses from the input first slice images.

In detail, for example, the image generation module 220 may include the generative neural network 222 and the discriminative neural network 224, or may include the generative neural network 222. Here, the generative neural network 222 may generate the second slice images read from the first slice images. Here, if the second slice thickness or the first slice thickness and the second slice thickness are input as parameters, the generative neural network 222 may generate, from the input first slice image, the second slice image to have a feature of the second slice thickness.

The image generation module 220 may be pretrained by using, as training data, a plurality of training slice image pairs each including a first training slice image of the first slice thickness and a second training slice image of the second slice thickness corresponding thereto.

Meanwhile, it is known that a superresolution (SR) scheme of converting a low resolution image to a high resolution image, that is, increasing a resolution is available. The SR is described in, for example, Non-Patent Document 2: [Chao Dong etal. Image Super-Resolution Using Deep Convolutional Networks, arXiv preprint arXiv: 1501.00092v3, 2015] Since the SR scheme described in this document also extracts a feature of an input image and regenerates an output image suitable for the feature, those skilled in the art may understand that operation S200 may be performed by applying the SR scheme.

Referring again to FIG. 4, the image reconstruction method according to the present invention further includes operation S300 of providing, by the image storage and transmission module 230 implemented by the computing apparatus 100, or supporting providing of the generated second slice image.

In operation S300, the generated second slice image may be stored through the storage and transmission module 230 and/or provided to an external entity through a predetermined display device, and/or provided to another apparatus interacting with the computing apparatus 100, for example, PACS.

Here, the external entity may include a user of the computing apparatus 100, a manager, a medical expert in charge of the subject, and the like. In addition, it may be understood that any entity that needs the second slice image produced from the first slice image may be included as the external entity. For example, the external entity may be an external artificial intelligence (AI) device that includes separate AI hardware module and/or software module using the second slice image. Also, "external" in the external entity is not construed to exclude an example embodiment in which AI hardware module and/or software module using at least one of the first slice image and the second slice image are integrated into the computing apparatus 100, and is used to represent that the second slice image that is a result of hardware module and/or software module performing the method of the present invention is available as input data of another method. That is, the external entity may be the computing apparatus 100 itself.

Meanwhile, the generated second slice image may be used for a doctor to easily perform reading and diagnosis.

Meanwhile, in on modification example of the image reconstruction method of the present invention, it is possible to simultaneously improve the accuracy and speed of reading by generating and displaying a corresponding second slice image only at a location with a high lesion suspicion and by displaying a first slice image at a location with a low lesion suspicion. Here, the lesion suspicion refers to a probability that a lesion detected in the first slice image is an actual lesion.

In this modification example, operation S200 may include operation S210 of, in response to the input of the series of first slice images, calculating, by the computing apparatus 100, or supporting the other apparatus to calculate a location of a lesion and a lesion suspicion with respect to the series of first slicing images and operation S220 of generating or supporting generating of the second slicing image only with respect to the first slicing image that meets a predetermined filtering condition according to the location of the lesion and the lesion suspicion. For example, the filtering condition may be a condition that, if the first slicing image includes a point present within a predetermined distance from a location of a lesion having a lesion confidence or suspicion of a predetermined threshold or more, the first slicing image meets the filtering condition.

This modification example may save computational resources and reduce efforts of a reader or AI since a second slicing image of a portion not suspected as a lesion is not generated.

In another modification example implementable in combination with this modification example or alone, in operation S200, the computing apparatus 100 provides or supports providing of the second slice image (e.g., display the second slice image to be recognizable by the external entity through a predetermined display device) in response to a manipulation of a user. Here, a first slice image from which a second slice image is not generated may be provided instead of the second slice image.

If the other modification example and the aforementioned modification example are combined, it is possible to improve the accuracy of reading or diagnosis of a reader or a computer reading aid system by providing a second slice image at a location with a high lesion suspicion, or to improve a speed of reading by conveniently use the accuracy of result information derived by the computer reading aid system for reading of a doctor and, here, providing a first slice image at a location with a low lesion suspicion.

Through the aforementioned example embodiments and modification examples, the present invention may refer to a relatively thin slice image with improved quality, thereby improving the accuracy of reading by a human or a computer reading aid system. Therefore, a doctor may make a further accurate diagnosis, which may lead improving the medical quality and innovating the workflow in the medical field with assistance of the AI.

One of ordinary skill in the art may easily understand that the methods and/or processes and operations described herein may be implemented using hardware components, software components, or a combination thereof based on the example embodiments. The hardware components may include a general-purpose computer and/or exclusive computing apparatus or a specific computing apparatus or a special feature or component of the specific computing apparatus. The processes may be implemented using at least one microprocessor having an internal and/or external memory, a microcontroller, an embedded microcontroller, a programmable digital signal processor or other programable devices. In addition, or, as an alternative, the processes may be implemented using an application specific integrated circuit (ASIC), a programmable gate array, a programmable array logic (PAL), or other devices configured to process electronic signals, or combinations thereof. In addition, targets of technical solutions of the present invention or portions contributing to the arts may be configured in a form of program instructions performed by various computer components and stored in non-transitory computer-readable recording media. The media may include, alone or in combination with the program instructions, data files, data structures, and the like. The program instructions recorded in the media may be specially designed and configured for the present invention, or may be known to those skilled in the art of computer software. Examples of the media may include magnetic media such as hard disks, floppy disks, and magnetic tapes; optical media such as CD-ROM discs, DVDs, and Blu-ray; magneto-optical media such as floptical disks; and hardware devices that are specially configured to store and perform program instructions, such as ROM, RAM, flash memory, and the like. Examples of program instructions may include a machine code, such as produced by a compiler and higher language code that may be executed by a computer using an interpreter. Examples of program instructions include both machine code, such as produced by a compiler and files containing structural programming languages such as C++ object-oriented programming language and high or low programming languages (assembly languages, hardware technical languages, database programming languages and techniques) to run not only on one of the aforementioned devices but also a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of the present invention, the aforementioned methods and combinations thereof may be implemented by one or more computing apparatuses as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to still another aspect, devices that perform operations associated with the aforementioned processes may include the aforementioned hardware and/or software. Such all of the sequences and combinations associated with the processes are to be included in the scope of the present invention.

For example, the described hardware devices may be configured to act as one or more software modules in order to perform processing according to the present invention, or vice versa. The hardware devices may include a processor, such as, for example, an MPU, a CPU, a GPU, and a TPU, configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

While the present invention is described with reference to specific matters such as components, some example embodiments, and drawings, they are merely provided to help general understanding of the present invention and this invention is not limited to the example embodiments. It will be apparent to those skilled in the art that various alternations and modifications in forms and details may be made from the description.

Therefore, the scope of the present invention is not defined by the example embodiments, but by the claims and their equivalents, and all variations within the scope of the claims and their equivalents are to be construed as being included in the present invention.

Such equally or equivalently modified example embodiments may include, for example, logically equivalent methods capable of achieving the same results as those acquired by implementing the method according to this invention. Accordingly, the present invention and the scope thereof are not limited to the aforementioned example embodiments and should be understood as a widest meaning allowable by law.

What is claimed is:

1. A method for a computer device generating an image, the method comprising:
   calculating, in response to an input of a series of first slice images of a subject, a lesion suspicion degree and a location for a lesion detected in the series of the first slice images;
   selecting a first slice image located within a predetermined distance from the location of the lesion for which the lesion suspicion degree above a predetermined threshold is calculated among the series of the first slice images;
   generating the second slice image based on the selected first slice image,
   wherein the second slice image has a second slice thickness (T) that is thinner than a first slice thickness (t) that is a slice thickness of the first slice image; and
   providing the generated second slice image.

2. The method of claim 1, wherein the generating is performed by a super resolution (SR).

3. The method of claim 1, wherein the generating is performed by an image generation module using a deep convolutional neural network (CNN) or a generative adversarial network (GAN).

4. The method of claim 3, wherein the image generation module is pretrained by using, as training data, a plurality of training slice image pairs each including a first training slice image of the first slice thickness and a second training slice image of the second slice thickness corresponding thereto.

5. The method of claim 1, wherein the providing comprises providing, by the computing apparatus, the second slice image and providing a first slice image of which a second slice image is not generated with the second slice image.

6. The method of claim 1, wherein a number of the selected first slice image is n (n≥1), m(m>n) second slice images are generated from the n (n≥1) first slice images, and the second slice thickness (T) is equal or greater than n*t/m.

7. A non-transitory computer-readable storage medium storing a program instruction that is executable by a computer to perform the method of claim 1.

8. A computing apparatus for generating an image, the apparatus comprising:
   a communicator configured to receive a series of first slice images of a subject; and
   a processor,
   wherein the processor is configured to calculate a lesion suspicion degree and a location for a lesion detected in a series of the first slice images in response to an input of the series of the first slice images of a subject, select a first slice image located within a predetermined distance from the location of the lesion for which the lesion suspicion degree above a predetermined threshold value is calculated among the series of the first slice images of the subject, generating the second slice image based on the selected first slice image, and provide the generated second slice image,
   wherein the second slice image has a second slice thickness (T) that is thinner than a first slice thickness (t) that is a slice thickness of the first slice image.

9. The apparatus of claim 8, wherein generating of the second slice image is performed by a superresolution (SR).

10. The apparatus of claim 8, wherein generating of the second slice image is performed by an image generation module implemented by the processor using a deep convolutional neural network (CNN) or a generative adversarial network (GAN).

11. The apparatus of claim 10, wherein the image generation module is pretrained by using, as training data, a plurality of training slice image pairs each including a first training slice image of the first slice thickness and a second training slice image of the second slice thickness corresponding thereto.

* * * * *